United States Patent
Kogawa et al.

(10) Patent No.: US 8,891,664 B2
(45) Date of Patent: Nov. 18, 2014

(54) TRANSMITTER AND RECEIVER

(75) Inventors: Tsuyoshi Kogawa, Kawasaki (JP); Koji Akita, Yokohama (JP); Koji Ogura, Tokyo (JP); Takafumi Sakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 388 days.

(21) Appl. No.: 12/880,765

(22) Filed: Sep. 13, 2010

(65) Prior Publication Data

US 2011/0243269 A1    Oct. 6, 2011

(30) Foreign Application Priority Data

Mar. 31, 2010  (JP) ................. 2010-084331

(51) Int. Cl.
*H04L 27/00* (2006.01)
*H04L 27/36* (2006.01)
*H04L 27/26* (2006.01)

(52) U.S. Cl.
CPC .......... *H04L 27/361* (2013.01); *H04L 27/2601* (2013.01)
USPC ....................................................... 375/295

(58) Field of Classification Search
USPC ....................................................... 375/286
See application file for complete search history.

(56) References Cited

U.S. PATENT DOCUMENTS

| | | | | |
|---|---|---|---|---|
| 5,274,510 | A * | 12/1993 | Sugita et al. | 360/49 |
| 5,991,286 | A * | 11/1999 | Labonte et al. | 370/337 |
| 6,075,474 | A * | 6/2000 | Gabet et al. | 341/143 |
| 2003/0237039 | A1* | 12/2003 | Qiu | 714/758 |
| 2004/0139383 | A1* | 7/2004 | Salvi et al. | 714/759 |
| 2006/0022798 | A1* | 2/2006 | Akiyama et al. | 340/10.1 |
| 2006/0077076 | A1* | 4/2006 | Hoshino et al. | 341/50 |
| 2006/0140306 | A1* | 6/2006 | Bisson et al. | 375/316 |
| 2006/0182200 | A1* | 8/2006 | Kim | 375/305 |
| 2006/0251148 | A1* | 11/2006 | Welborn et al. | 375/130 |
| 2007/0291868 | A1* | 12/2007 | Olesen et al. | 375/267 |
| 2008/0012740 | A1* | 1/2008 | Li et al. | 341/107 |
| 2008/0214126 | A1* | 9/2008 | Holt | 455/93 |
| 2008/0232510 | A1* | 9/2008 | Golitschek Edler Von Elbwart et al. | 375/298 |
| 2009/0052578 | A1* | 2/2009 | Sawai | 375/299 |
| 2009/0147837 | A1* | 6/2009 | Lau | 375/219 |

(Continued)

FOREIGN PATENT DOCUMENTS

JP    2004-147052    5/2004

OTHER PUBLICATIONS

Office Action issued Jan. 17, 2012, in Japanese Patent Application No. 2010-084331 (with English-language translation).

*Primary Examiner* — Chieh Fan
*Assistant Examiner* — Santiago Garcia
(74) *Attorney, Agent, or Firm* — Oblon, Spivak, McClelland, Maier & Neustadt, L.L.P.

(57) ABSTRACT

The transmitter includes a first bit generator, a modulator, a second bit generator and a bit converter. The first bit generator generates bits to be transmitted based on the first wireless scheme. The modulator for the first wireless scheme performs at least amplitude modulation of a multiple level on the bits generated by the first bit generator. The second bit generator generates a bit to be transmitted based on the second wireless scheme. The bit converter converts the bit generated by the second bit generator and inputs converted bits to the modulator wherein the bit converter converts the bit generated by the second bit generator so that a signal showing High in the second wireless scheme is modulated to amplitude of a high level in the multiple level in the modulator.

4 Claims, 11 Drawing Sheets

(56) References Cited

U.S. PATENT DOCUMENTS

| | | | |
|---|---|---|---|
| 2009/0279620 A1* | 11/2009 | Schenk | 375/260 |
| 2010/0040170 A1* | 2/2010 | Qu et al. | 375/298 |
| 2010/0040171 A1* | 2/2010 | Qu et al. | 375/298 |
| 2011/0021246 A1* | 1/2011 | Rofougaran | 455/552.1 |
| 2011/0028182 A1* | 2/2011 | Trachewsky et al. | 455/552.1 |
| 2011/0280236 A1* | 11/2011 | Rofougaran | 370/338 |

\* cited by examiner

TRANSMITTER AND RECEIVER

CROSS REFERENCE TO RELATED APPLICATIONS

This application is based upon and claims the benefit of priority from the prior Japanese Patent Application No. 2010-084331, filed on Mar. 31, 2010, the entire contents of which are incorporated herein by reference.

FIELD

The present invention relates to a transmitter for transmitting a wireless signal and a receiver.

BACKGROUND

These days, there are various kinds of wireless communication systems such as wireless LAN system based on IEEE 802.11a/g, DSRC system using amplitude modulation, Bluetooth, etc. Since communication of each wireless communication system is based on each wireless communication scheme, a communication device corresponding to a certain wireless communication system generally cannot communicate with a communication device corresponding to another wireless communication system. A user wishing to use a plurality of wireless communication systems has to have own communication devices corresponding to respective wireless communication systems.

A communication device corresponding to a plurality of wireless communication systems is useful, but such a communication device has to include modulators corresponding to the plurality of communication systems. In this case, since a plurality of modulators are required, the size and cost of the device are increased.

There existed a digital modulation device including a QPSK baseband processor and an ASK baseband processor, in which a controller determines which baseband processor should be used to transmit a signal.

A conventional transmitter capable of communicating with a first wireless communication system and a second wireless communication system each being based on a different modulation scheme has to include the functions of both of the wireless communication systems separately, which leads to a problem of increase in size and cost of the device.

BRIEF DESCRIPTION OF THE DRAWINGS

FIG. 10 is a diagram showing a scrambler based on IEEE 802.11a.

DETAILED DESCRIPTION

According to one embodiment, there is provided with a transmitter capable of communicating with a first wireless scheme and a second wireless scheme different from each other.

The transmitter includes a first bit generator, a modulator, a second bit generator and a bit converter.

The first bit generator generates bits to be transmitted based on the first wireless scheme.

The modulator for the first wireless scheme performs at least amplitude modulation of a multiple level on the bits generated by the first bit generator to generate a wireless signal.

The second bit generator generates a bit to be transmitted based on the second wireless scheme.

The bit converter converts the bit generated by the second bit generator and inputs converted bits to the modulator. Here, the bit converter converts the bit generated by the second bit generator so that a signal showing High in the second wireless scheme is modulated to amplitude of a high level in the multiple level in the modulator.

Hereinafter, embodiments will be explained in detail referring to the drawings.

Figure 1:
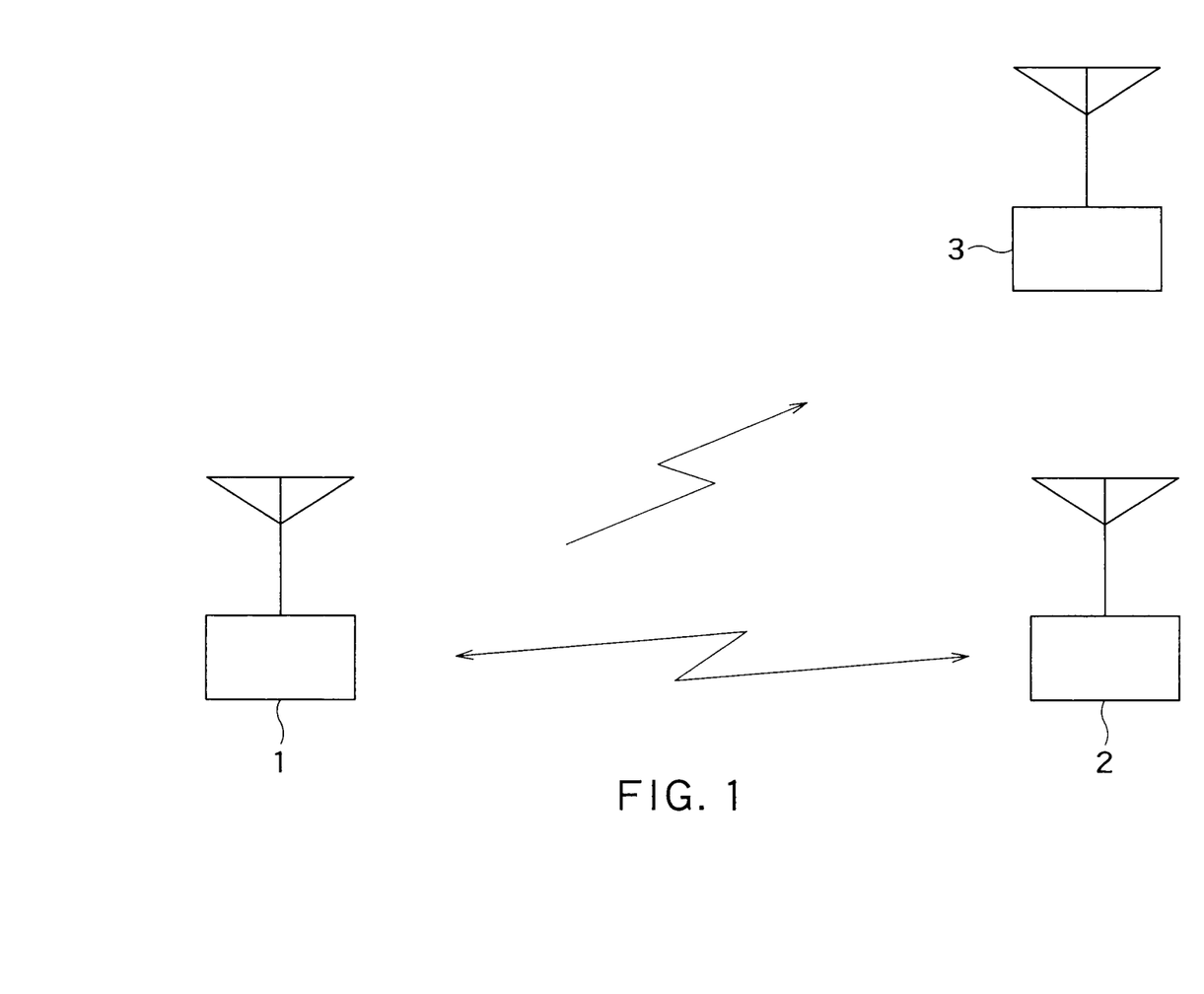
FIG. 1 is an overall view of a wireless communication system according to a first embodiment.

FIG. 1 is an overall view of a wireless communication system according to a first embodiment. A transmitter 1 can wirelessly communicate with a receiver 2 having functions based on a first demodulation scheme, and also with a receiver 3 having functions based on a second demodulation scheme. Note that each of the receivers 2 and 3 corresponds to only one demodulation scheme in this case, but can correspond to both of the demodulation schemes.

The first demodulation scheme is employed to demodulate a multilevel amplitude-modulated wireless signal, and a 16 QAM modulated wireless signal can be demodulated, for example. Note that a modulation scheme corresponding to the first demodulation scheme is referred to as a first modulation scheme, and wireless communication using the first demodulation scheme is referred to as a first wireless system.

The second demodulation scheme is employed to demodulate a pulse-modulated wireless signal on which envelope detection can be performed, and a PPM modulated wireless signal can be demodulated, for example. Note that a modulation scheme corresponding to the second demodulation scheme is referred to as a second modulation scheme, and wireless communication using the second demodulation scheme is referred to as a second wireless system.

The transmitter 1 in the present embodiment is characterized in generating a wireless signal which can be demodulated based on the second demodulation scheme, by using the functions based on the first modulation scheme.

Figure 2:
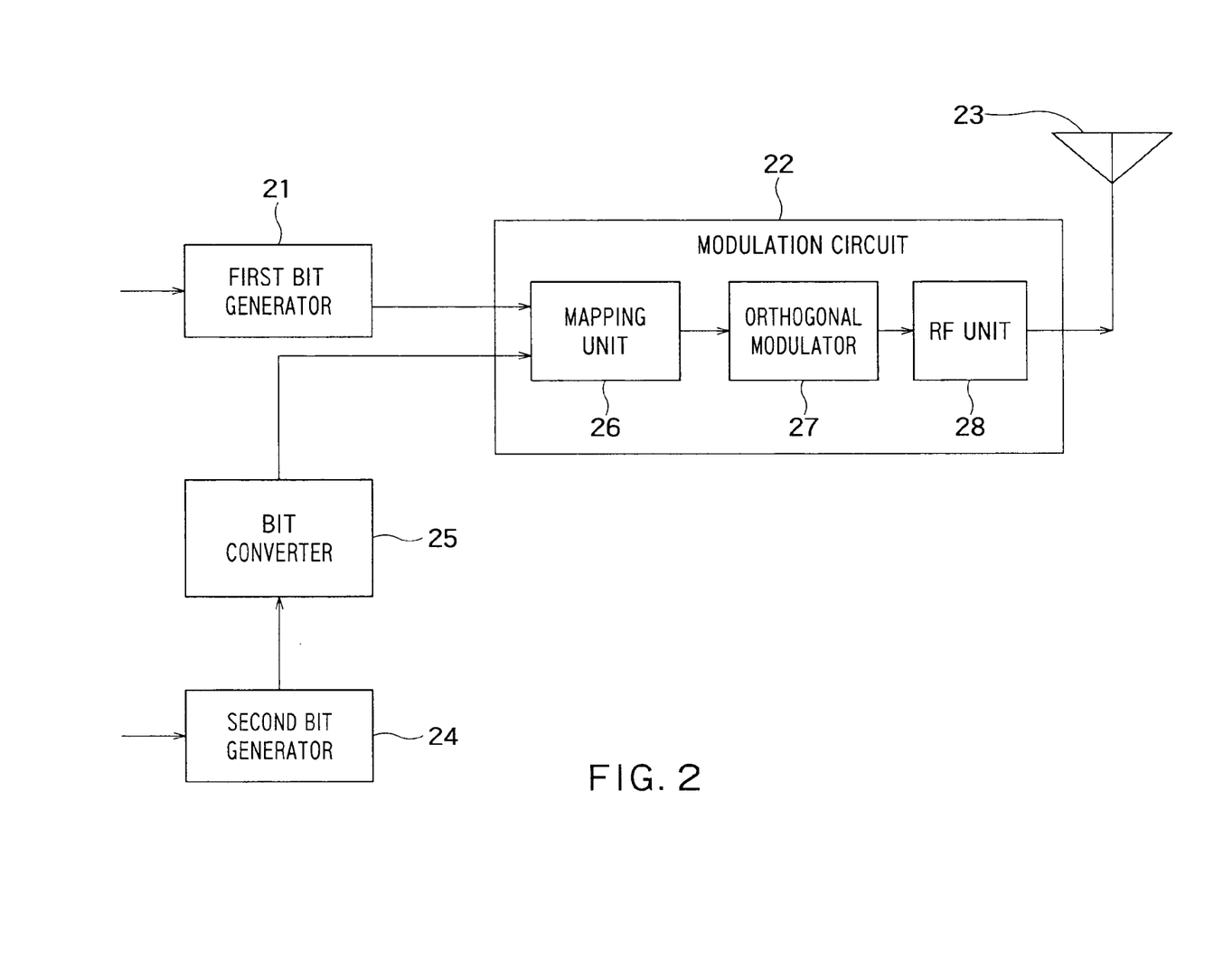
FIG. 2 is a block diagram of a transmitter according to the first embodiment.

FIG. 2 shows a block diagram of the transmitter 1.

The transmitter 1 includes: a first bit generator 21; a modulation circuit 22; an antenna 23; a second bit generator 24; and a bit converter 25. Further, the modulation circuit 22 is a semiconductor circuit based on the first modulation scheme including: a mapping unit 26; an orthogonal modulator 27; and an RF unit 28.

When the transmitter 1 transmits a bit to the receiver 2, the first bit generator 21 generates a bit to be transmitted and directly inputs the generated bit to the modulation circuit 22, and a wireless signal generated based on the first modulation scheme is transmitted from the antenna 23.

On the other hand, when the transmitter 1 transmits a bit to the receiver 3, the second bit generator 24 generates a bit to be transmitted, and the bit converter 25 convents the generated bit and inputs the converted bit to the modulation circuit 22, the conversion being performed so that the receiver 3 can demodulate a bit modulated and transmitted based on the first modulation scheme. The modulation circuit 22 receives the converted bit, generates a wireless signal based on the first modulation scheme, and transmits the signal from the antenna 23.

Note that to which one of the receiver 2 and the receiver 3 the signal should be transmitted is determined by a control signal from an upper layer (not shown). When the control signal from the upper layer directs to transmit the signal to the receiver 2, the first bit generator 21 operates and the second bit generator 24 does not operate. On the other hand, when the control signal from the upper layer directs to transmit the signal to the receiver 3, the second bit generator 24 operates and the first bit generator 21 does not operate.

The converter circuit 22 will be explained in detail.

The mapping unit 26 performs multilevel (two-level or higher) amplitude modulation on the inputted bit. Hereinafter, a case using 16 QAM will be explained. Note that the modulation scheme is not limited to 16 QAM, and 64 QAM or another scheme for multilevel amplitude modulation can be employed.

Figure 3:
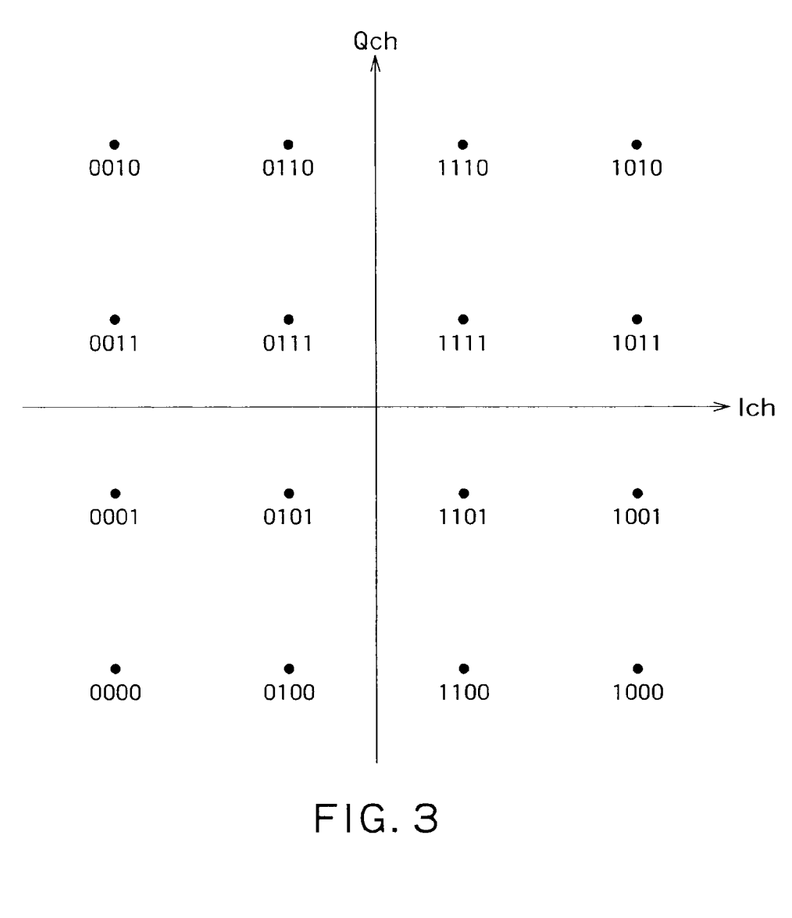
FIG. 3 is a diagram showing an example of 16-QAM mapping.

FIG. 3 is a diagram showing an example of 16-QAM mapping. When inputted bits are 1111, 0111, 0101, or 1101, the bits are mapped onto the mapping point showing the smallest amplitude. When inputted bits are 1011, 1110, 0110, 0011, 0001, 0100, 1100, or 1001, the bits are mapped onto the mapping point showing the secondary smallest amplitude. When inputted bits are 1010, 0010, 0000, or 1000, the bits are mapped onto the mapping point showing the largest amplitude. That is, amplitude in 16 QAM is three-level.

The mapping unit 26 maps the inputted bits, and outputs Ich and Qch, which are obtained by the mapping, to the orthogonal modulator 27.

The orthogonal modulator 27 performs orthogonal modulation on the Ich and Qch inputted from the mapping unit 26, and outputs the modulated signal to the RF unit 28.

The RF unit 28 up-converts the frequency of the signal modulated by the orthogonal modulator 27 to a transmit frequency, performs a filtering process and an amplifying process, and outputs the signal to the antenna 23.

Next, the bit converter 25 will be explained in detail. The bit converter 25 performs bit conversion so that a transmission signal which can be demodulated by the receiver 3 can be generated. Hereinafter, a case in which the receiver 3 can demodulate a PPM modulated signal will be explained. Note that the modulation scheme is not limited to PPM, and OOK or ASK can be employed.

Figure 4:
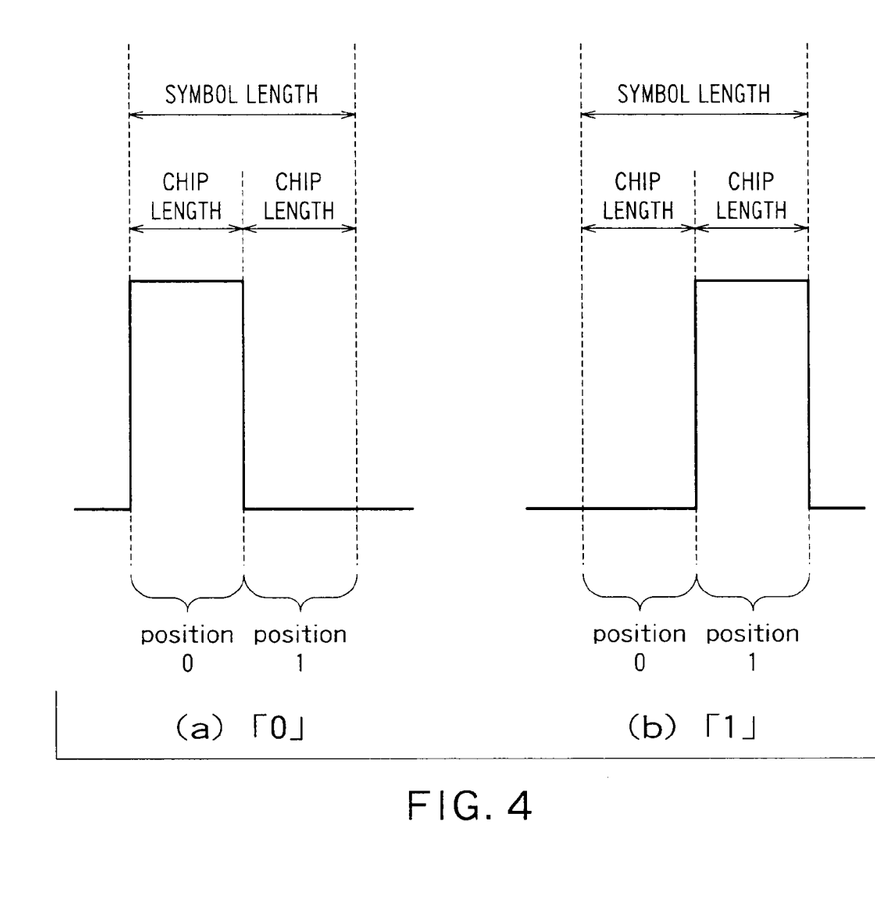
FIG. 4 is a diagram explaining binary PPM, which is a kind of pulse-phase modulation technique.

FIG. 4 is a diagram explaining binary PPM, which is a kind of pulse-phase modulation technique. In the binary PPM, one bit is transmitted as one symbol. One symbol is formed of two chips. The symbol represents binary data 0 when the former chip shows High and the latter chip shows Low, and represents binary data 1 when the former chip shows Low and the latter chip shows High.

In the following case, it is assumed that the symbol length based on the second modulation scheme is four times larger than the symbol length based on the first modulation scheme. Note that the above number is not limited to four.

In PPM, bit 0 is transmitted by transmitting High and Low in this order. When "1" represents High and "0" represents Low, the bit converter converts bit 0 to bits 10 first. Similarly, when transmitting bit 1, the bit converter converts bit 1 to bits 01.

Hereinafter, the conversion process of the bit converter 25 will be explained by using an example in which bit 0 is generated by the second bit generator 24.

First, bit 0 is converted to bits 10 to perform PPM modulation.

Next, in order to generate High through mapping, one bit pattern is selected from the mapping points showing the highest level in 16 QAM. Here, 0000 is selected in FIG. 3.

Similarly, in order to generate Low through mapping, one bit pattern is selected from the mapping points showing the lowest level in 16 QAM. Here, 1111 is selected in FIG. 3.

In accordance with the mapping pattern of 16 QAM, the bit converted to bit 10 is further converted to 00001111. The length of the bits corresponds to two symbols in 16 QAM. Since the symbol length based on the second modulation scheme is four times larger than the symbol length based on the first modulation scheme, each bit is repeated twice to transmit 0000000011111111.

That is, the bit converter converts bit 0 generated by the second bit generator 24 to 0000000011111111.

Similarly, the bit converter converts bit 1 generated by the second bit generator 24 to 1111111100000000.

As stated above, the bit converter 25 of the transmitter 1 performs the above bit conversion process, and thus a wireless signal which can be demodulated by the receiver 3 can be transmitted to the receiver 3 by using the first modulation scheme.

Further, with this configuration, a wireless signal based on the second modulation scheme such as an OOK or PPM signal can be generated by merely changing the generating method of the bit generator generally formed of software, without adding any change to the existing modulation circuit formed of hardware based on the first modulation scheme.

Figure 5:
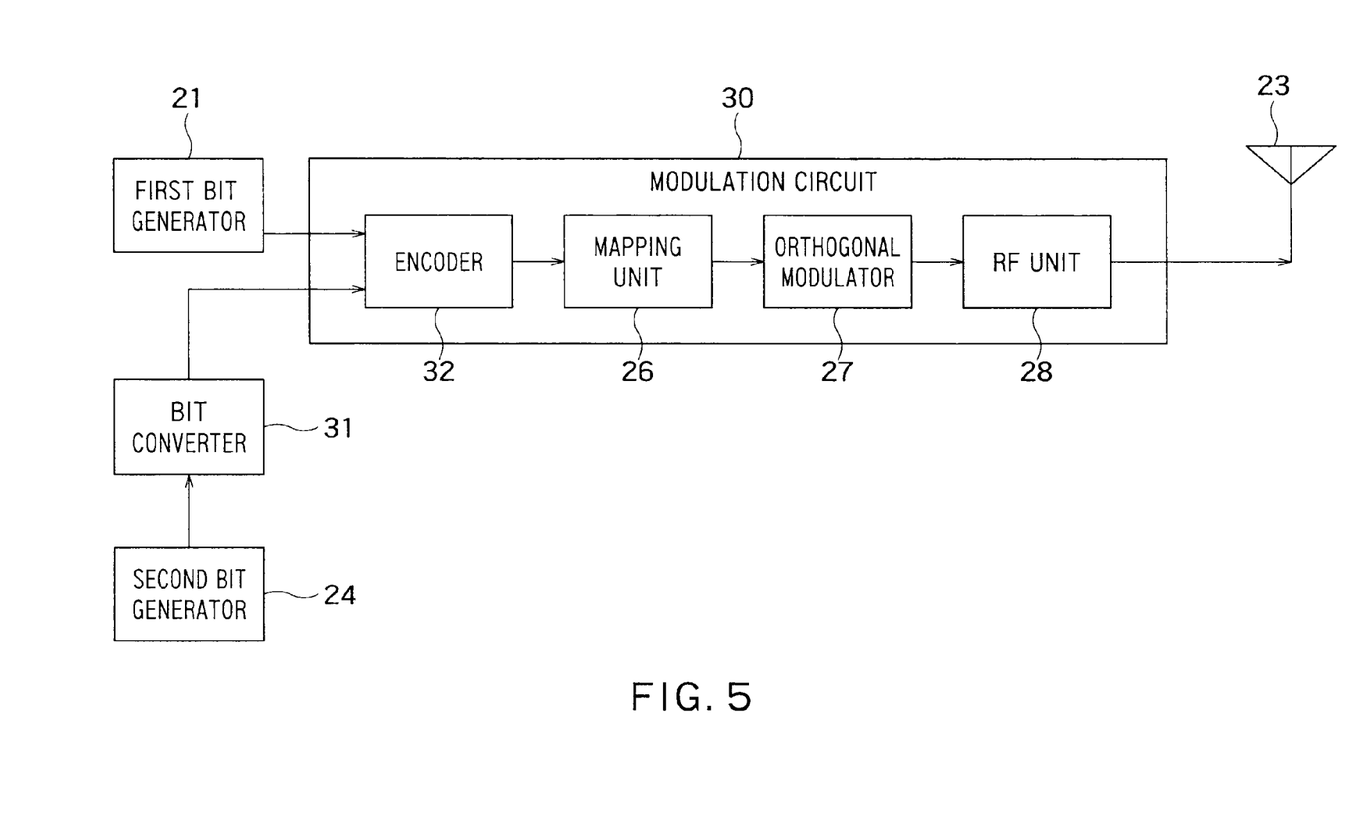
FIG. 5 is a block diagram of a transmitter according to a second embodiment.

Next, a second embodiment will be explained. In FIG. 5, the second embodiment is different from the first embodiment in that a modulation circuit additionally includes an encoder 32 and a bit converter 31 performs a different process. Note that since the other blocks are not changed, the same symbols are given thereto and the explanation thereof will be omitted.

The encoder 32 performs encoding by using a bit sequence formed of several bits sequentially inputted in the past, and generates encoded bits. The encoded bits thus generated are outputted to the mapping unit 26.

Convolution encoding will be explained below as an example of the encoding of the encoder 32. Note that the encoding method is not limited to the convolution encoding, and another encoding method such as turbo encoding can be employed to perform encoding by using a bit sequence formed of several bits sequentially inputted in the past.

Figure 6:
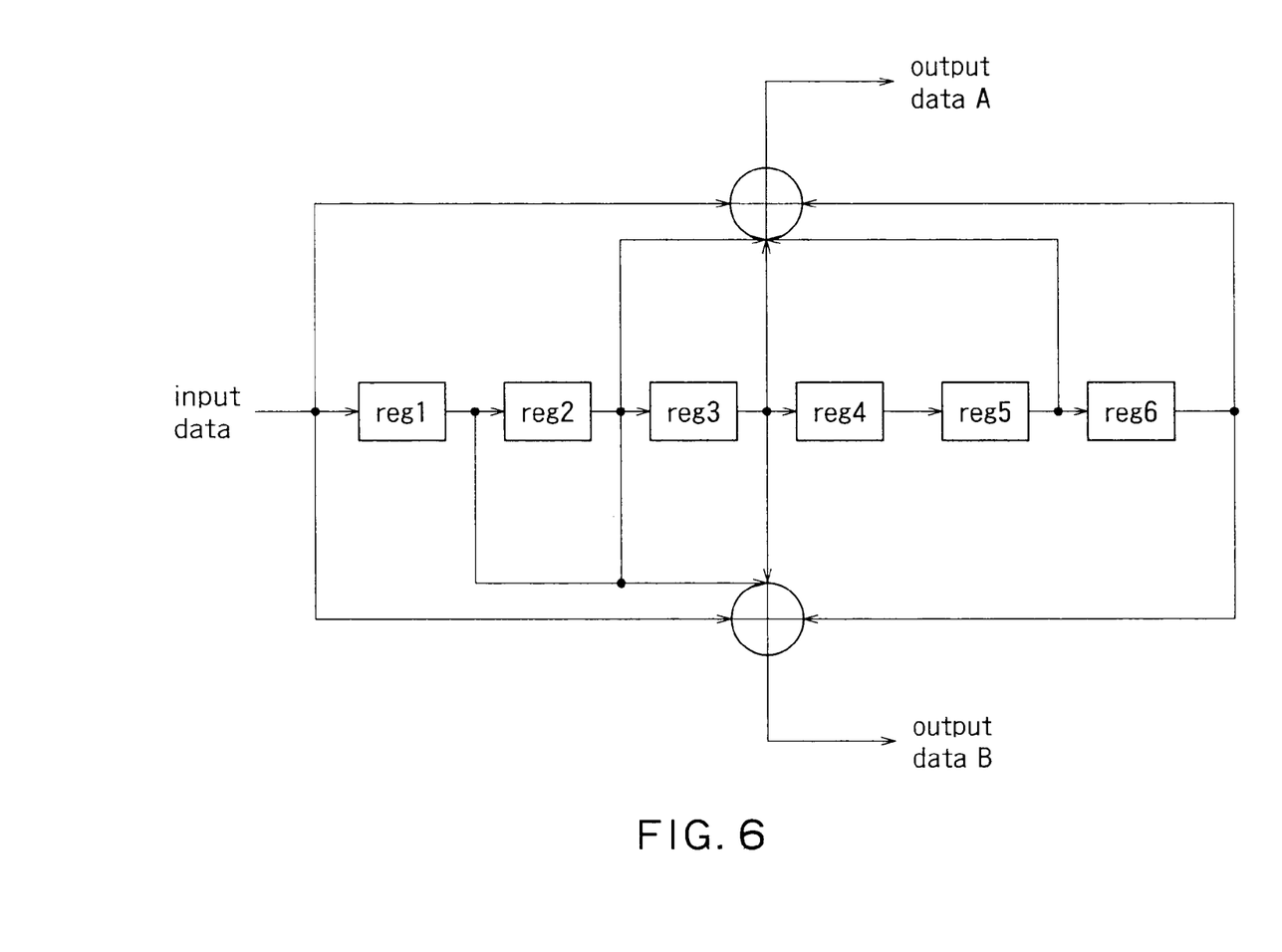
FIG. 6 is a diagram showing an example of a convolution encoder.

Explanation will be made based on a concrete example shown in FIG. 6. FIG. 6 shows a convolution encoder having a constraint length of 7 to perform convolution encoding, in which g0=1338 and g1=1718 in generator polynomials and encoding ratio R=1/2. This convolution encoder is the same as that based on IEEE 802.11a.

Based on 7 bits obtained by adding up 1-bit input bit and the bits stored in shift registers reg 1, reg 2, . . . , reg 6, an output bit A and an output bit B, the sum of which is 2 bits, are outputted. Note that "+" in FIG. 6 represents exclusive OR.

Here, when every shift register stores a value of 0 and the input bit has a value of 0, each of the output A and the output B is bit 0. On the other hand, when every shift register stores a value of 1 and the input bit has a value of 1, each of the output A and the output B is bit 1. That is, by sequentially inputting an input bit of 0 or 1 to the encoder a certain number times so that the certain number is equal to or greater than the constraint length, 0 or 1 can be outputted.

Note that when changing the output from 0 to 1 or from 1 to 0, 0 and 1 coexist with each other in a transient state. This will be explained by using the following example.

Now, it is assumed that every shift register in FIG. 6 has a value of 0. When the input bit has a value of 0, the value of the output A is 0, which is because (the value of the input bit)+ (the value of the reg 2)+(the value of the reg 3)+(the value of the reg 5)+(the value of the reg 6)=0. Note that "+" represents exclusive OR. Similarly, the value of the output B is 0, which is because (the value of the input bit)+(the value of the reg 1)+(the value of the reg 2)+(the value of the reg 3)+(the value of the reg 6)=0. Accordingly, when the input bit having a value of 0 is inputted, 2 bits 00 are outputted. Since every shift register has a value of 0 in this case, bits 00 are outputted as long as 0 is continuously inputted.

Next, consideration will be given on a case in which the input bit having a value of 1 is inputted. In this case, based on the calculation as stated above, the output A is 1 and the output B is 1. Accordingly, bits 11 are outputted when the input bit has a value of 1.

Further consideration will be given on another case in which the input bit having a value of 1 is inputted. In this case, the shift register reg 1 has a value of 1 and each of the other shift registers has a value of 0. Based on the calculation as stated above, the output A is 1 and the output B is 0. Accordingly, bits 10 are outputted when the input bit has a value of 1.

Figure 7:
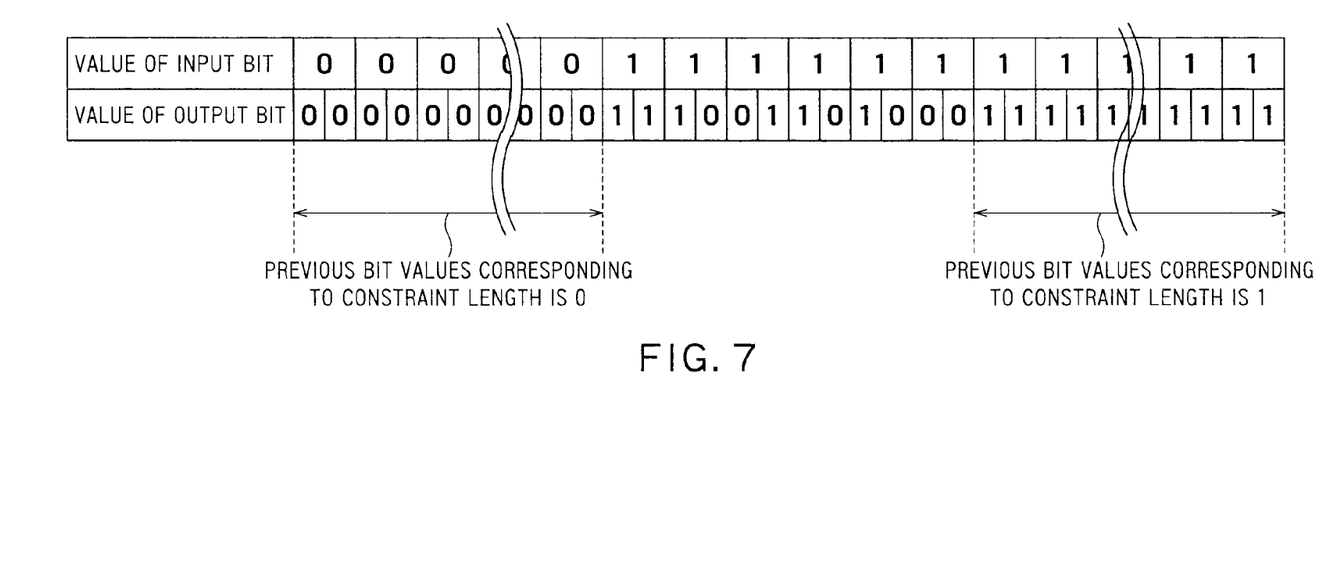
FIG. 7 is a diagram showing the values of output bits.

FIG. 7 shows output bit values obtained by a similar calculation. When every one of the previous bit values corresponding to the constraint length is 0, every output bit value is 0. When every one of the previous bit values corresponding to the constraint length is 1, every output bit value is 1. In an transient state in which the value of each shift register is changed from 0 to 1, the combination of 0 and 1 is outputted within 12 bits, which is obtained by the equation of 6/(1/2)=12 since the shift registers have 6 bits in total and the encoding ratio is 1/2.

Next, a conditional expression for the bit conversion in the bit converter 31 will be explained considering the operation of the encoder 32. Here, 16 QAM is employed similarly to the first embodiment.

In order to transmit High, bits 0000 should be inputted to the mapping unit 26. Therefore, the bit converter 31 should perform bit conversion so that 0 is inputted to the encoder 32 twice when every shift register has a value of 0. Similarly, in order to transmit Low, bits 1111 should be inputted to the mapping unit 26. Therefore, the bit converter 31 should perform bit conversion so that 1 is inputted to the encoder 32 twice when every shift register has a value of 1.

Note that 0000 or 1111 cannot be inputted to the mapping unit in a process to convert the value of every shift register from 0 to 1 or from 1 to 0. When the shift registers have 6 bits in total and encoding ratio is 1/2, the combination of 0 and 1 is outputted within 12 bits, which is obtained by the equation of 6/(1/2)=12 as stated above.

Since one symbol transmits 4-bit information in 16 QAM, High or Low cannot be arbitrarily transmitted within three symbols (12/4=3). When the chip length in PPM (the wireless communication system 2) shown in FIG. 4 is equal to or smaller than the length of three symbols in 16 QAM (the wireless communication system 1), High or Low cannot once be arbitrarily transmitted in one chip length.

Accordingly, the chip length in the wireless communication system 2 is made three or more times larger than the symbol length in the wireless communication system 1, by which High or Low can be arbitrarily transmitted. For example, when the chip length in the wireless communication system 2 is made four times (4 symbols×4=16 bits) larger than the symbol length in the wireless communication system 1, at least one of four symbols in 16 QAM can be arbitrarily set to High or Low in one chip length.

Generally, $N_{sys2bit}$, which is the bit number assigned to the chip length in the wireless communication system 2 (the number of bits outputted from the first encoder), satisfies a conditional expression of $N_{sys2bit}=r_{bit}/R+b_{symbol}$. Note that $r_{bit}$ represents the number of bits of the registers used in the first encoder ((the constraint length)−1 [bits]), R represents encoding ratio, and $b_{symbol}$ represents the number of bits in one symbol modulated by the mapping unit.

The bit converter 31 converts a bit so that the above conditional expression is satisfied and outputs bits obtained by the conversion to the encoder 32.

The above explanation is based on a case in which the receiver 3 performs PPM demodulation, but similar consideration can be given when OOK is employed. By replacing the chip length in PPM with the bit length in OOK, similar explanation can be made. Note that the chip length can be defined as the bit length in OOK.

As stated above, in the second embodiment, the number of bits in the second chip length is made equal to or greater than $r_{bit}/R+b_{symbol}$ to make it possible to create a state in which a code word does not have 0 and 1 at the same time and to transmit a desired PPM or OOK signal to the receiver 3 even when a modulation circuit 30 performs convolution encoding or Reed-Solomon encoding.

Next, a third embodiment will be explained.

Figure 8:
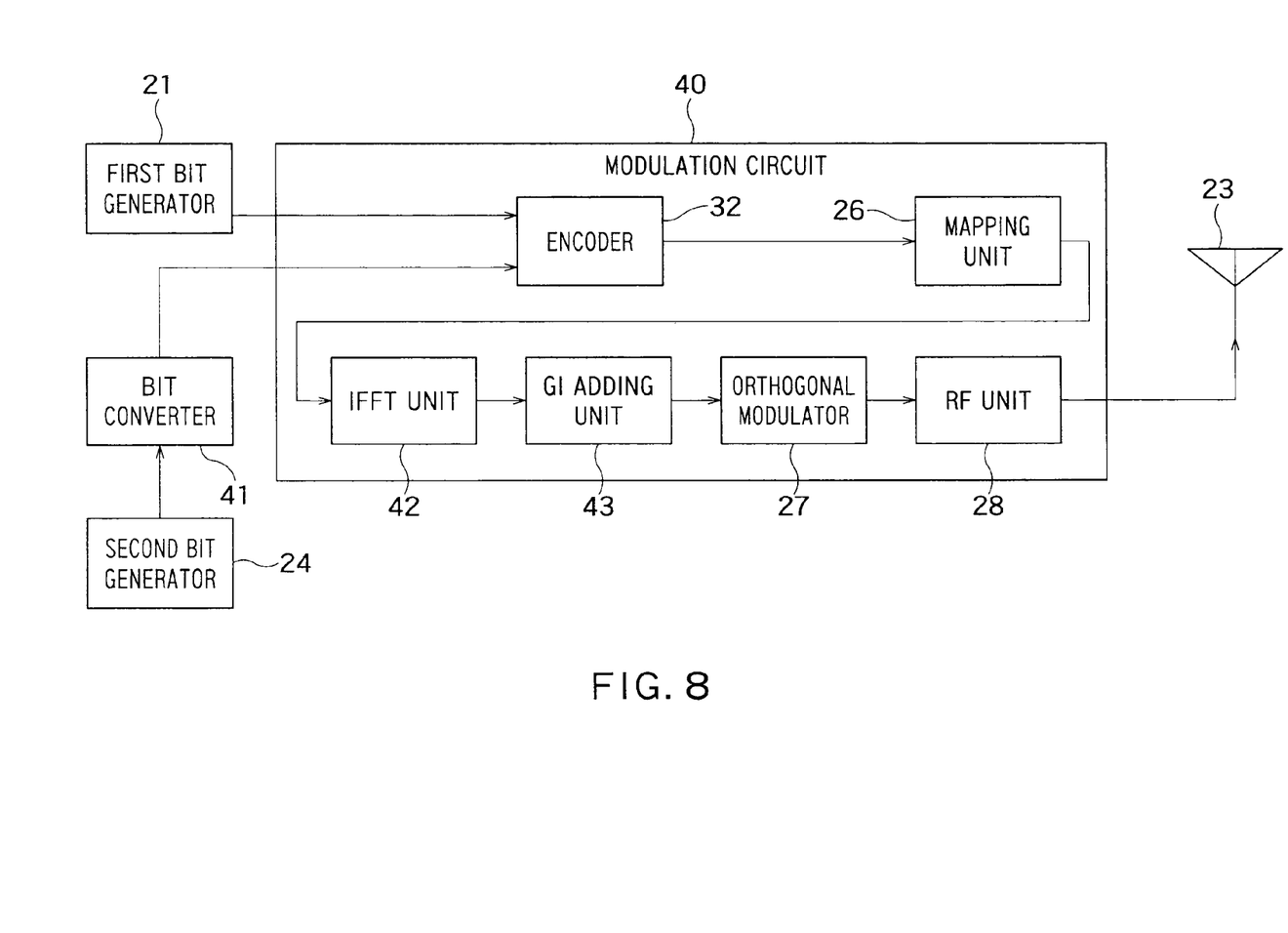
FIG. 8 is a block diagram of a transmitter according to a third embodiment.

FIG. 8 is shows a block diagram of a transmitter according to the third embodiment. In this example, a modulation circuit 40 performs OFDM, which is a kind of multicarrier, as secondary modulation. Note that the modulation scheme is not limited to OFDM, and another multicarrier modulation can be employed.

The third embodiment is different from the second embodiment in that the modulation circuit 40 additionally includes an IEFT unit 42 and a GI adding unit 43 and a bit converter 41 performs a different process. Note that since the other blocks are not changed, the same symbols are given thereto and the explanation thereof will be omitted.

The IFFT unit 42 performs serial/parallel conversion on a plurality of Ich and Qch inputted from the mapping unit 26, and converts a signal on the frequency domain to a signal on the time domain by Inverse Fast Fourier Transform (IFFT). The signal on the time domain obtained by the conversion is outputted to the GI adding unit 43.

The GI adding unit 43 receives the signal on the time domain inputted from the IFFT unit 42. The GI adding unit 43 adds a guard interval (GI) to an OFDM symbol and outputs that to the orthogonal modulator.

First, the functions of OFDM required in the present embodiment will be summarily explained.

In the number of subcarriers included in the OFDM symbol, which is represented by $p_{all}$, the number of pilot subcarriers is represented by $p_{pit}$ and the number of data subcarriers is represented by $p_{data}$. In the following example, 16 QAM is performed on $p_{data}$ data subcarriers as in the first and second embodiments.

Electric power of a certain OFDM symbol is the total electric power of all subcarriers included in the OFDM symbol. For example, in the mapping points shown in FIG. 3, the electric power of an IFFT-modulated symbol having subcarriers every one of which is mapped onto the point showing bits 0000 is larger than the electric power of an IFFT-modulated symbol having subcarriers every one of which is mapped onto the point showing bits 1111.

Generally, a specific mapping point is predetermined as the mapping point for the pilot subcarriers, which makes it impossible to map every subcarrier onto the point showing bits 0000 or 1111. However, by mapping the data subcarriers as stated above, a symbol having large or small electric power can be generated.

When encoding method such as convolution encoding is not employed, High or Low can be generated on a symbol basis by the above method.

As explained in the second embodiment, when changing the value of every shift register from 0 to 1 or from 1 to 0 in the encoder 32, 0000 or 1111 cannot inputted to the mapping unit 26. The OFDM symbol including a combination of symbols other than bits 0000 or 1111 makes it difficult to arbitrarily generate High or Low.

Accordingly, in order to prevent the OFDM symbol from including a combination of symbols other than bits 0000 or 1111, the chip length in the wireless communication system 2 is made a predetermined times larger than the OFDM symbol length in the wireless communication system 1, by which High or Low can be arbitrarily transmitted.

Generally, $N_{sys2sys}$, which is the OFDM symbol number assigned to the chip length in the wireless communication system 2, should satisfy an expression of $N_{sys2sys}=2$ when $r_{bit}/R<=b_{symbol} \times p_{data}$, and should satisfy an expression of $N_{sys2sym}=g(r_{bit}/(R^*b_{symbol}^*p_{data}))+1$ when $r_{bit}/R > b_{symbol} \times p_{data}$. Note that $g(x)$ is a function returning a minimum integer which is not smaller than x.

Note that $r_{bit}$ represents the number of bits of the registers used in the encoder ((the constraint length)−1 [bits]), R represents encoding ratio, and $b_{symbol}$ represents the number of bits in one symbol modulated by the mapping unit 26.

$N_{sys2bit}$, which is the bit number assigned to the chip length in the wireless communication system 2 (the number of bits outputted from the encoder 32) should satisfy an expression of $N_{sys2bit}=b_{symbol} \times p_{data} \times 2$ when $r_{bit}/R=b_{symbol} \times p_{data}$, and should satisfy an expression of $N_{sys2bit}=g(r_{bit}/(R^*p_{data}))^*p_{data}+b_{symbol} \times p_{data}$ when $r_{bit}/R > b_{symbol} \times p_{data}$.

The bit converter 41 converts a bit so that the above expression is satisfied and outputs bits obtained by the conversion to the encoder 32.

With the above configuration, a desired PPM signal can be transmitted to the receiver 3 even when the secondary modulation scheme in the wireless communication system 1 is multicarrier modulation such as OFDM.

The above explanation is based on a case in which the wireless communication system 2 performs PPM demodulation, but similar consideration can be given when OOK is employed. By replacing the chip length in PPM with the bit length in OOK, similar explanation can be made. Note that the chip length can be defined as the bit length in OOK.

As explained above, in the third embodiment, bit conversion is performed considering the number of data subcarriers included in multicarrier such as OFDM, by which an OOK or PPM signal can be arbitrarily generated with high accuracy.

Figure 9:
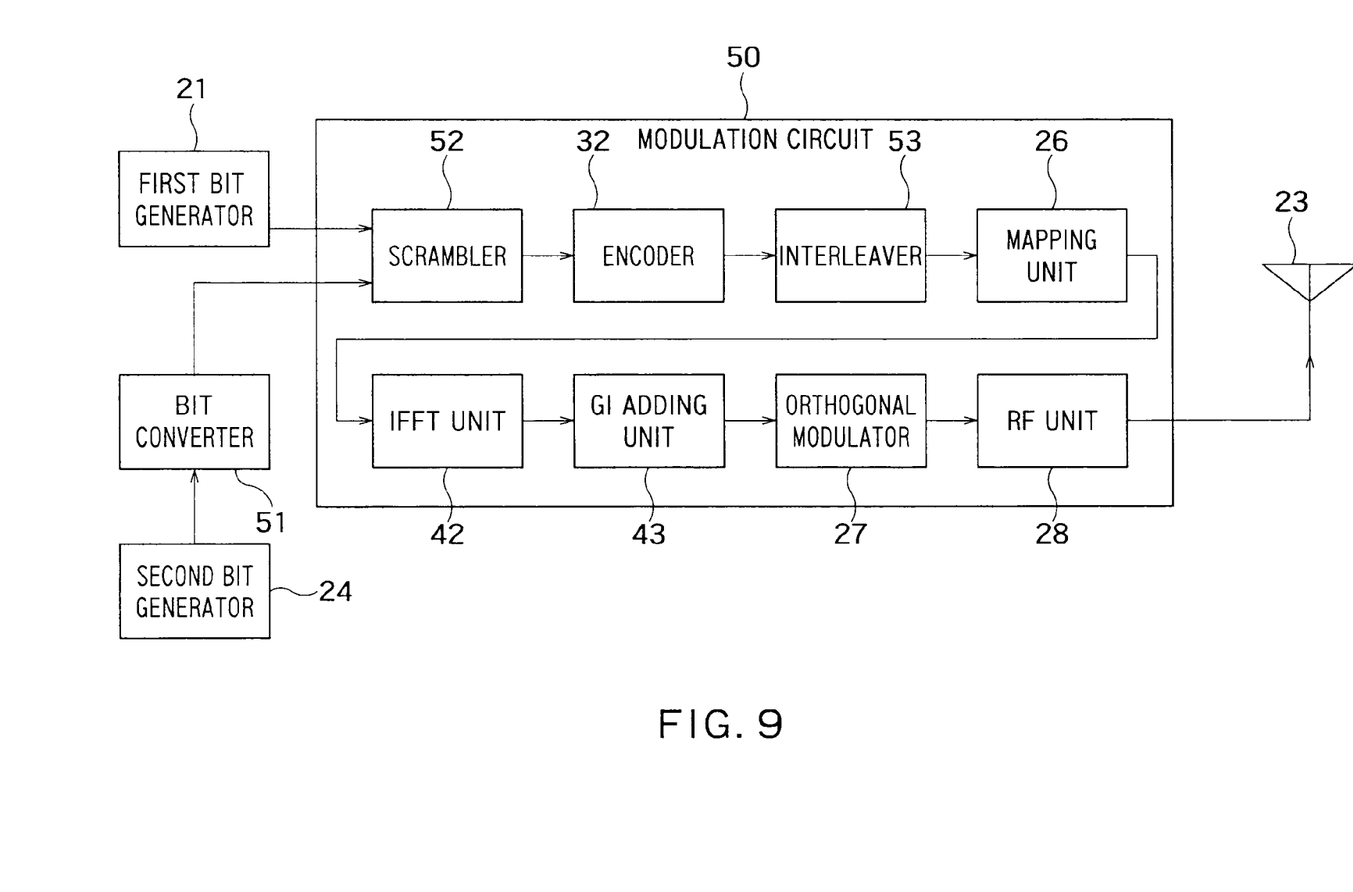
FIG. 9 is a block diagram of a transmitter according to a fourth embodiment.

Next, a fourth embodiment will be explained. FIG. 9 is shows a block diagram of the transmitter 1 according to the fourth embodiment. The block diagram of FIG. 9 shows every physical layer block required to transmit a transmission signal based on IEEE 802.11a.

The fourth embodiment is different from the third embodiment in that a modulation circuit 50 additionally includes a scrambler 52 and an interleaver 53 and a bit converter 51 performs a different process. Note that since the other blocks are not changed, the same symbols are given thereto and the explanation thereof will be omitted.

Figure 10:
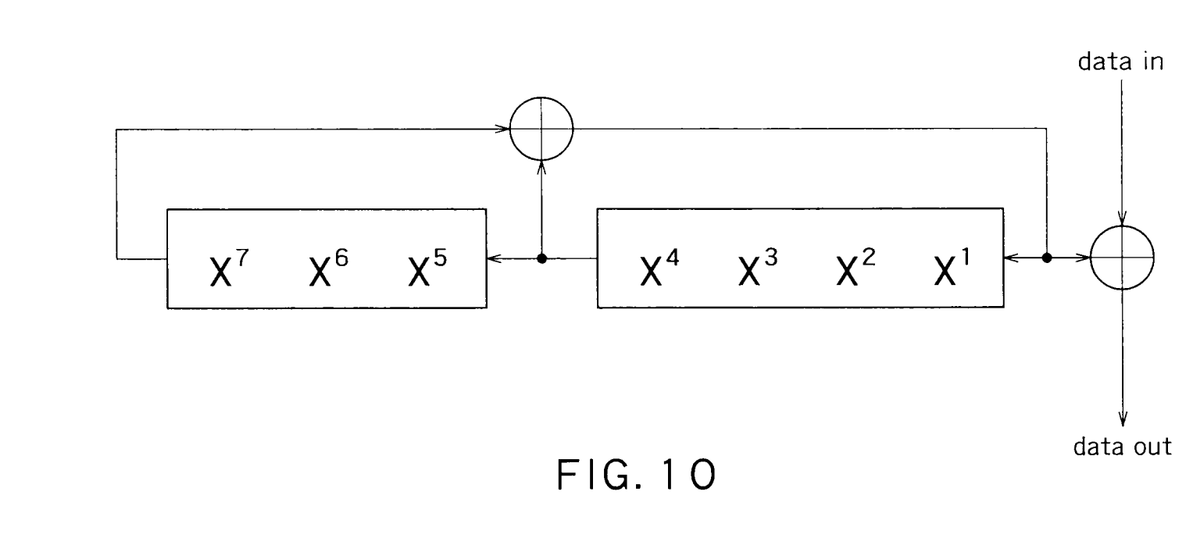

The scrambler 52 performs a scrambling process on inputted bits. The bits converted by the scrambling process are outputted to the encoder 32. FIG. 10 shows the scrambler 52 based on IEEE 802.11a. The scrambler 52 is formed of 7-bit shift registers and two operators for calculating exclusive OR, and outputs 1 bit when 1 bit is inputted.

The interleaver 53 interleaves the bits inputted from the encoder 32. The interleaving is performed on one OFDM symbol basis. The interleaved bits are outputted to the mapping unit 26.

The bit converter 51 should obtain the values of the shift registers of the scrambler 52 in order to control the bits given to the encoder 32. Therefore, the bit converter 51 has the same functions as the scrambler 52.

By using the same functions as the scrambler 52, the bit converter 51 judges which one of 0 and 1 should be inputted to the scrambler 52 in order to let the scrambler 52 output 0, and outputs bits obtained by the judgment. Similarly, by using the same functions as the scrambler 52, the bit converter 51 judges which one of 0 and 1 should be inputted to the scrambler 52 in order to let the scrambler 52 output 1, and outputs bits obtained by the judgment. Since the bit converter 51 performs the above process, the output from the scrambler can be set at an arbitrary value.

On the other hand, the interleaver 53 based on IEEE 802.11a performs interleaving on an OFDM symbol basis. Accordingly, when every bit included in an OFDM symbol is 0 or 1, every bit included in the OFDM symbol after passing through interleaving can be kept 0 or 1. Therefore, the bit converter 51 performs conversion so that the encoder 32 outputs bits 0000 or 1111. Note that it is possible that the one is all 0's or all 1's and the other is a combination of 0 and 1 for simplification.

Since the bit converter 51 performs the above bit conversion process, a desired PPM or OOK signal can be transmitted to the receiver 3 even when the wireless communication system 1 is a wireless LAN system based on IEEE 802.11a and includes a modulator having a scrambler and an interleaver.

Figure 11:
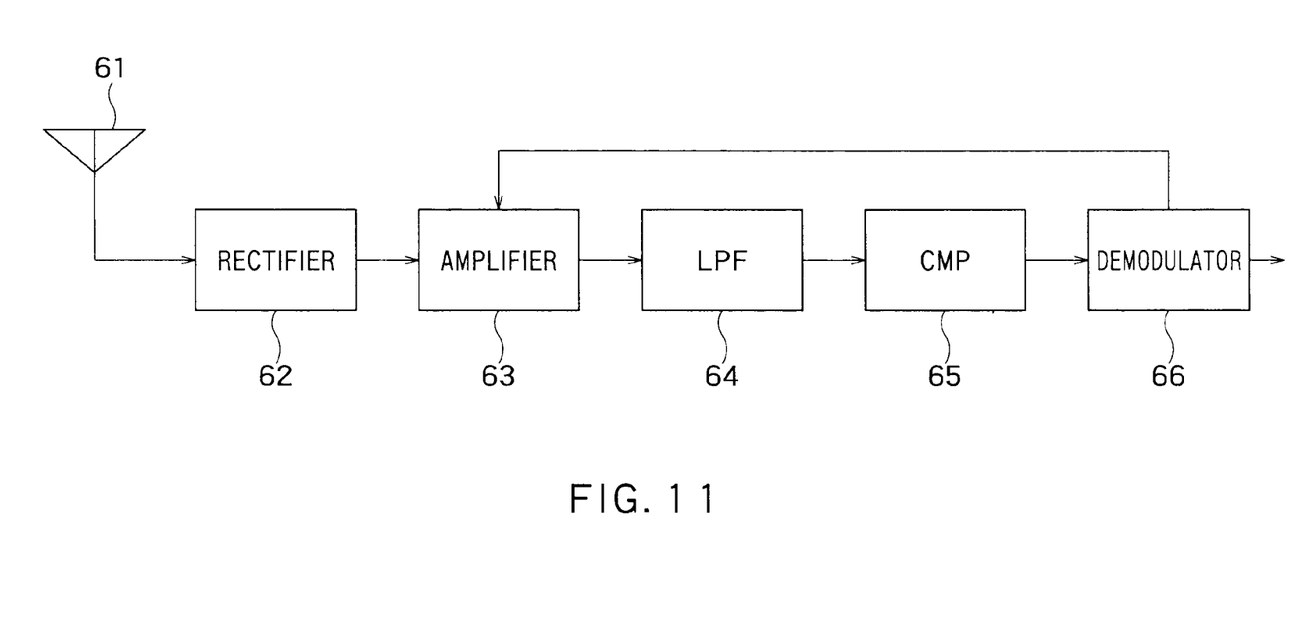
FIG. 11 is a block diagram of a receiver according to the first to fourth embodiments.

Next, explanation will be made on the receiver 3 which receives a wireless signal transmitted from a transmitter according to any one of the first to fourth embodiments explained above. FIG. 11 shows a block diagram of the receiver 3. The receiver 3 includes: an antenna 61; a rectifier 62; an amplifier 63; an LPF (Low Pass Filter) 64; a CMP 65; and a demodulator 66. Note that the receiver 3 is not limited to the above structure.

The antenna 61 receives a transmission signal transmitted from the transmitter 1, converts received electromagnetic waves to a voltage level signal, and outputs the signal to the rectifier 62. The rectifier 62 rectifies the inputted voltage level signal, and outputs the rectified voltage level signal to the amplifier 63. The amplifier 63 converts the voltage level of the voltage level signal outputted from the rectifier 62, and outputs the converted signal to the LPF 64. Further, the amplifier 63 is inputted with a control signal from the demodulator 66, and changes the gain for converting the level in accordance with the inputted control signal.

The LPF 64 performs a filtering process on the voltage level signal inputted from the amplifier 63, and outputs the filtered voltage level signal to the CMP 65. Note that the LPF 64 can be omitted in the first and second embodiments since these embodiments do not cover OFDM.

The CMP 65 compares the inputted voltage level signal with a predetermined reference voltage level, and outputs, to the demodulator 66, bit 1 when the voltage level signal is larger or bit 0 when the reference voltage level is larger.

The demodulator 66 performs a demodulation process on the binary signal inputted from the CMP 65, and outputs information data obtained by the demodulation process to an upper layer. Further, the demodulator 66 outputs a control signal to make the amplifier 63 control the gain in accordance with the result of the demodulation process.

When the transmission signal shown in the third and fourth embodiments is an OFDM signal, the signal outputted from the amplifier has a broad bandwidth. When the receiver 3 receives an OFDM signal transmitted from the transmitter 1, the bandwidth of the signal outputted from the amplifier corresponds to the bandwidth of the OFDM signal. In order to extract a PPM or OOK signal from the OFDM signal, the LPF 64 is employed to attenuate the frequency band of the OFDM signal and pass frequency components corresponding to the chip rate of the PPM or OOK signal.

The filtering process of the LPF 64 makes it possible to extract frequency components of the PPM or OOK signal to output that to the CMP 65. That is, by setting the cut-off frequency of the LPF smaller than the bandwidth of the OFDM signal and larger than the band corresponding to a period of the chip length in the wireless communication system 2, the PPM or OOK signal can be demodulated. In the receiver 3, the cut-off frequency of the LPF 64 is set to satisfy the conditions described in the third and fourth embodiments, by which the receiver 3 can communicate with the transmitter 1 by demodulating the PPM or OOK signal transmitted from the transmitter 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A transmitter capable of communicating with a first wireless scheme and a second wireless scheme different from each other, comprising:
   a first bit generator configured to generate bits to be transmitted based on the first wireless scheme;
   a modulator for the first wireless scheme configured to perform at least Quadrature Amplitude Modulation of a multiple level on the bits generated by the first bit generator to generate a wireless signal;
   a second bit generator configured to generate a bit to be transmitted based on the second wireless scheme;
   a bit converter configured to convert the bit generated by the second bit generator and input converted bits to the modulator; and
   an encoder arranged at a previous stage toward the modulator configured to perform encoding based on information bits $r_{bit}$ ($r_{bit}>=1$) in a past by coding ratio R, wherein
   the bit converter converts the bit generated by the second bit generator so that a signal showing High in the second wireless scheme is modulated to a quadrature-associated amplitude of a high level in the Quadrature Amplitude Modulation of the multiple level by the modulator,
   a number of bits corresponding to one symbol to be modulated by the modulator is $b_{symbol}$ ($b_{symbol}>1$), and
   the bit converter bit-converts a chip length obtained by modulation of the second wireless scheme so that bits obtained by encoding in the encoder becomes $r_{bit}/R+b_{symbol}$ bits or more.

2. The transmitter according to claim 1, wherein
   the modulator performs a multicarrier modulation scheme including secondary modulation with p ($p>=1$) data subcarriers, and
   the bit converter bit-converts the chip length to $b_{symbol} \times p_{data} \times 2$ bits or more when $r_{bit}/R<=b_{symbol} \times p_{data}$, and $g(r_{bit}/(R*p_{data}))*p_{data}+b_{symbol} \times p_{data}$ bits or more when $r_{bit}/R>b_{symbol} \times p_{data}$ where g(x) is a function returning a minimum integer which is not smaller than x.

3. The transmitter according to claim 2, wherein
   the modulator relates one mapping point of mapping points having a maximum amplitude level to all 0's or all 1's and
   the bit converter generates bits so that encoded bits by the encoder corresponding the High in the second wireless scheme are all 0's or all 1's and encoded bits by the encoder corresponding the Low in the second wireless scheme are bits having both 1 and 0.

4. A receiver capable of demodulating a wireless signal modulated and transmitted by a transmitter capable of communicating with a first wireless scheme and a second wireless scheme different from each other, the transmitter comprising: a first bit generator configured to generate bits to be transmitted based on the first wireless scheme; a modulator for the first wireless scheme configured to perform at least Quadrature Amplitude Modulation of a multiple level on the bits generated by the first bit generator to generate the wireless signal; a second bit generator configured to generate a bit to be transmitted based on the second wireless scheme; and a bit converter configured to convert the bit generated by the second bit generator and input converted bits to the modulator, wherein the bit converter converts the bit generated by the second bit generator so that a signal showing High in the second wireless scheme is modulated to a quadrature-associated amplitude of a high level in the Quadrature Amplitude Modulation of the multiple level by the modulator, and the receiver is capable of demodulating the wireless signal modulated and transmitted by the transmitter based on the bit generated by the second bit generator, the receiver comprising:
   a low pass filter having cut-off frequency characteristic which is equal to or smaller than a modulation bandwidth modulated by the modulator of the transmitter and is equal or larger than a bandwidth corresponding to a period of a chip length obtained by modulation of the second wireless scheme.

* * * * *